TEMPERATURE MEASURING APPARATUS

Filed June 22, 1950

RAYMOND T. PIERCE
INVENTOR.

BY Rudolph J. Junick
ATTORNEY

Oct. 25, 1955 R. T. PIERCE 2,721,480

TEMPERATURE MEASURING APPARATUS

Filed June 22, 1950 2 Sheets-Sheet 2

RAYMOND T. PIERCE
INVENTOR.

BY Rudolph J. Jurick
ATTORNEY

United States Patent Office 2,721,480

Patented Oct. 25, 1955

1

2,721,480

TEMPERATURE MEASURING APPARATUS

Raymond T. Pierce, Millburn, N. J., assignor to Weston Electrical Instrument Corporation, Newark, N. J., a corporation of New Jersey Application June 22, 1950, Serial No. 169,759

10 Claims. (Cl. 73—353)

This invention relates to temperature measuring apparatus and more particularly to a novel arrangement for the measurement of the average temperature of a liquid.

My invention will be described with specific reference to apparatus adapted for the measurement of the average temperature of oil contained in a storage tank, but it will be apparent the features of the invention are equally useful for the measurement of the temperature of other liquids in other containers.

In oil storage tanks it is necessary to know the average temperature of the oil at any specific level or depth thereof. It is known that the volume of such liquid varies with the temperature and that available metering apparatus does not include automatic means compensating for temperature changes. Such metering apparatus is calibrated at some standard or base temperature, usually 60° F. Consequently, unless allowance is made for the actual temperature of the oil at the time of metering, a loss accrues to the seller if the temperature of the oil is below 60° F. and, on the other hand, such loss befalls the purchaser if the oil temperature is above this temperature.

Inasmuch as the temperature of oil within a storage tank varies at different levels, an accurate determination of the average temperature requires an averaging of the various temperatures throughout the entire depth of the oil. Further, the actual depth of the oil varies from time to time, thereby complicating such temperature measurement.

An object of this invention is the provision of apparatus for the measurement of the average temperature of a liquid regardless of the actual depth of the liquid.

An object of this invention is the provision of a float-actuated apparatus for the measurement of the average temperature of the liquid contained within a storage compartment, said apparatus automatically adjusting itself in response to changes in the liquid level.

An object of this invention is the provision of apparatus for the measurement of the average temperature of a liquid, said apparatus comprising a pivoted member carrying a float at one end, a temperature-sensitive element within the said member, and remotely-positioned, temperature-indicating means responsive to the changes in the temperature-sensitive element.

An object of this invention is the provision of a float-actuated, electrical resistance element for the automatic measurement of the temperature of a liquid throughout the entire depth thereof.

An object of this invention is the provision of a float-actuated, gas pressure element for the measurement of the temperature of a liquid throughout the entire depth thereof.

An object of this invention is the provision of float-controlled apparatus for the measurement of the average temperature of a liquid, said apparatus comprising a pantograph arrangement, a plurality of temperature-sensing units carried thereby, and remotely-positioned, temperature-indicating means responsive to the temperature-sensing units.

2

These and other objects and advantages will be apparent from the following description when taken with the accompanying drawings, illustrating several embodiments of the invention. The drawings are for purposes of illustration and are not to be construed as defining the scope or limits of the invention, reference being had for the latter purpose to the appended claims.

In the drawings wherein like reference characters denote like parts in the several views.

Figures 1, 2, 3, 4:
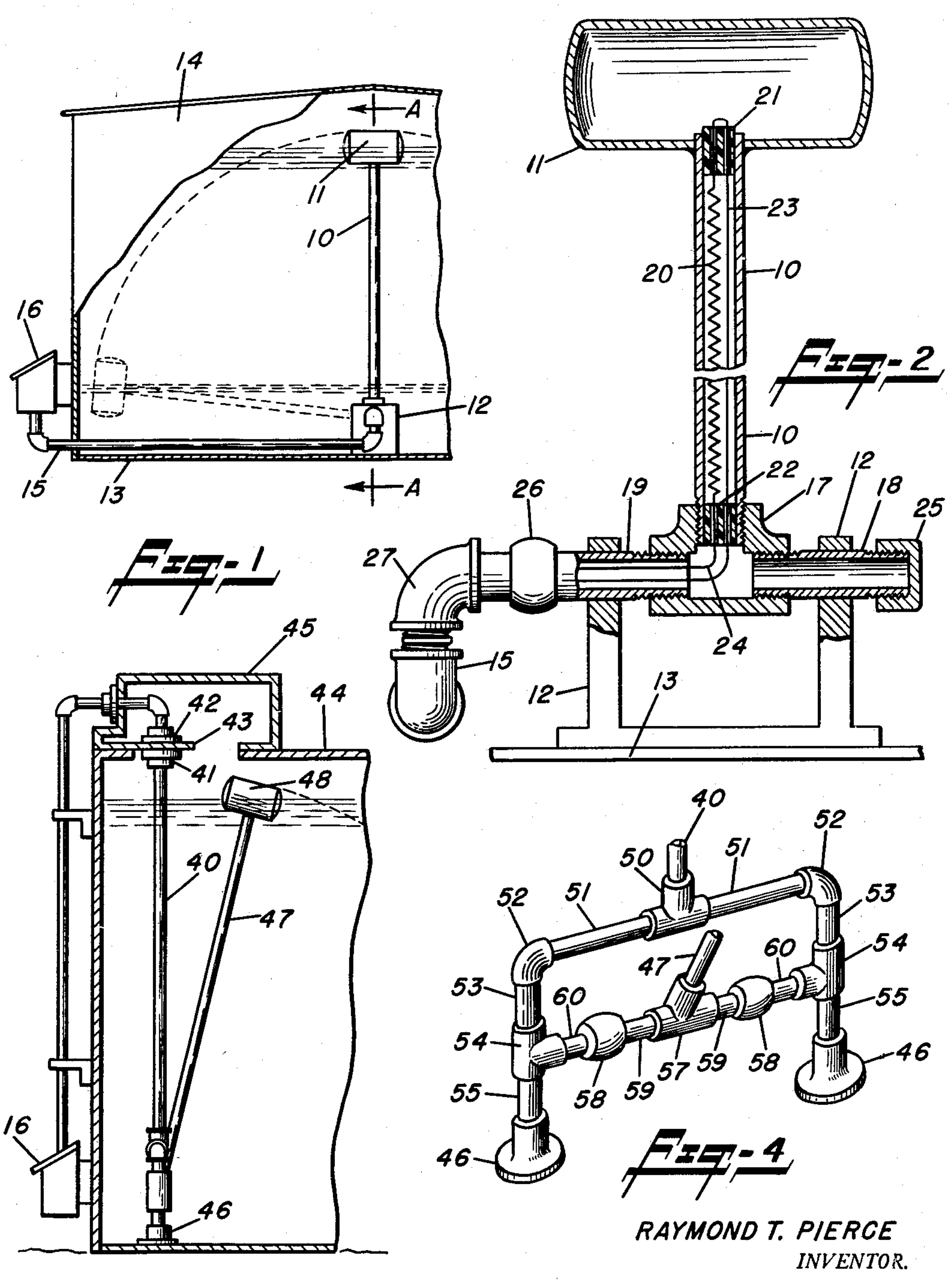
Figure 1 is a fragmentary view of an oil storage tank with parts broken away to show one form of the float-actuated arrangement.
Figure 2 is a cross-sectional view taken along the line A—A of Figure 1 and drawn to an enlarged scale to illustrate the construction for pivotal movement of the float-carrying arm.
Figure 3 is a fragmentary view of an oil storage tank and showing another arrangement of the pivoted arm and float.
Figure 4 is an isometric view, drawn to an enlarged scale, and showing the anchoring and pivotal arrangement of the Figure 3 device.

Referring now to Figures 1 and 2, one embodiment of my invention comprises a tubular member or pipe 10 having a float 11 secured to one end, as by soldering, welding or etc. The other end of the pipe is mounted for pivotal rotation within a bracket 12 resting on the bottom 13 of the storage tank 14. If the bracket 12 is massive its weight will serve to anchor the float-carrying pipe and the connecting pipe 15, the latter extending through the tank wall and terminating in a housing 16 attached to the side of the tank. Alternatively, the bracket may be welded, or otherwise secured, to the tank bottom. As shown in Figure 2, the lower end of the pipe 10 is threaded into a T fitting 17. The pipe nipples 18, 19 are also threaded into opposite ends of the T fitting and pass through alined clearance holes in the legs of the U-shaped bracket 12. It will be apparent the alined nipples 18, 19 serve as the rotational axis for the pipe 10, whereby the latter is free to rotate in response to the position of the float 10. When the storage tank is filled to normal capacity the float and pipe will occupy the upright position (Figure 1), whereas the float and pipe will occupy a substantially horizontal position, as shown by the dotted lines, when the storage tank is practically empty. Intermediate levels of the liquid within the tank will result in a corresponding intermediate position of the float, but it is to be noted that the entire length of the pipe 10 is immersed within the liquid regardless of the level thereof. Also, the pipe 10, for all liquid levels, will extend substantially throughout the liquid depth. Consequently, if the temperature-sensing element is distributed throughout the length of the pipe 10 it, at all times, will be responsive to the average temperature of the liquid through the entire liquid depth. One such temperature-sensing element may comprise a coil 20 of wire having a relatively high temperature coefficient of resistance.

Figures 5, 6, 7, 8, 9:
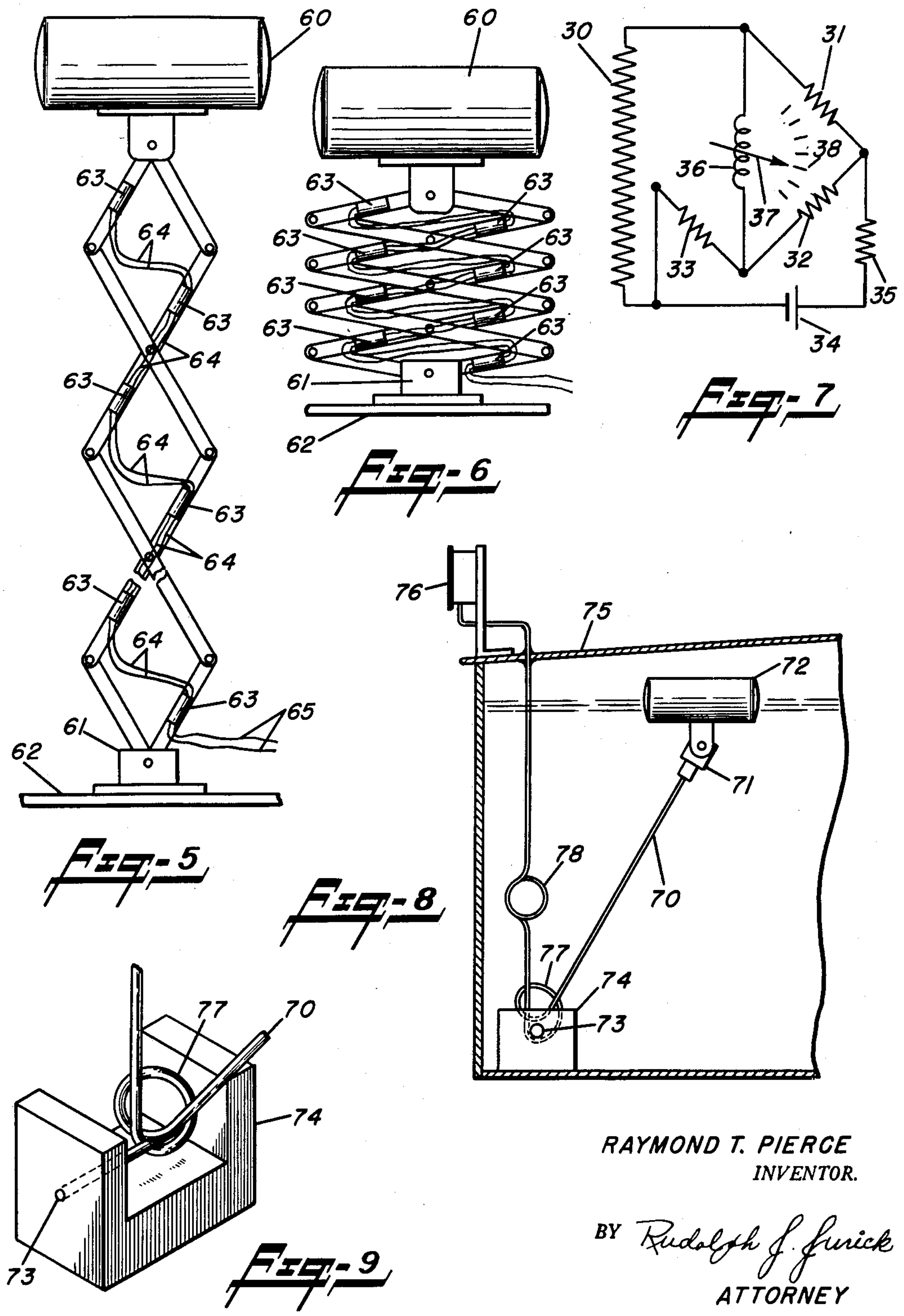
Figure 5 illustrates another arrangement wherein the temperature-sensing elements are carried by the arms of a float-controlled, pantograph mechanism.
Figure 6 is similar to Figure 5 but showing the pantograph mechanism collapsed in response to a lowering of the liquid level.
Figure 7 illustrates a representative Wheatstone bridge circuit for providing temperature indications in response to resistance changes.
Figure 8 is a fragmentary view of an oil storage tank and showing a vapor-pressure bulb type of temperature measuring apparatus.
Figure 9 is a fragmentary, isometric view, drawn to an enlarged scale, of the lower portion of the Figure 8 arrangement.

A pair of i
ends of the
the passage
are connec
prefer to u
out the ler
the elemer
coils serial
The oute
cap 25 and
nected to a
the pipe 1:
and the ass
therefore, ;
possible de
fumes arisi
In the a
sistance va
the temper
throughout
thereof, su
temperatur
may be em
the coil re
circuit is il
represents
20. The r
bridge, the
value resist
by a const
across opp
is limited t
indicating i
junctions, :
sistance 30
rent will fl
change in t
the bridge
movable co
to the cali
in the art.
The ind
battery ma
outer tank
these comp
as an instr
such stora
In the F
is free to f
sponse to :
Figures
tain instal
disposed p
threaded f
plate 43 v
The upper
wall of th
housing 1(
carries a
bottom an
tachment (
described
the entire
through th
upper flar
considerat
retaining 1
ture-sensit
tends thro
nection le
the housin
reference
Referrir
pipe 40 is
with the r l stand.
e struc-
means
pipe 47
to the
l joints
nipples
e 47, T
thin the
the an-
he level t of the
d to one
referred
l of the
hat may
in any
ive ele-
ph, said
own in
be con-
e entire
g circuit
level of
arrange-
gure 5.
ollapsed
elements
lepth of
s is rethe in-
erature-
to such rein the
ty filled
ivotally
is thin-
rod 73
or block
tank 75
al loops
at crack-
sition of
ner suit-
f expan-
s a scale
t. Inas-
or block
lepth of
scale of
age temare not
own the
for pro-
or by a
al upon
predeter-
e liquid rature of
erable to
niformly
reby the
quid will
hange in
ilize the
nvention
niformly
support-
t, signifi-
generally occur at significantly-spaced, vertical levels and, therefore, a temperature-sensing element having a spaced uniform distribution, as shown in Figure 5, will provide a sufficiently accurate measurement of the average temperature of the liquid throughout its entire depth. Consequently, it will be understood that the phrase "substantially, uniformly distributed throughout the length of he member," as used in the claims, is intended to cover the continuously uniformly distributed and spaced uniformly distributed character of the temperature-sensing element.

Having now described my invention certain variations in the arrangement and assembly of the parts will suggest themselves to those skilled in this art without thereby departing from the spirit and scope of the invention as set forth in the following claims.

I claim:

1. A float-actuated arrangement for use in the determination of the average temperature of a liquid subject to changes in actual level in a tank, said arrangement comprising an elongated rigid member, means pivotally securing one end of said member at the bottom of a liquid-containing tank, said member having float means adapted to support the other end of said member adjacent the level of the said liquid, and a temperature-sensitive element substantially uniformly distributed throughout the length of said member.

2. The invention as recited in claim 1, wherein the temperature-sensitive element comprises a wire whose ohmic resistance changes with temperature.

3. The invention as recited in claim 1, wherein the temperature-sensitive element comprises a plurality of spaced coils whose ohmic resistance varies with temperature.

4. The invention as recited in claim 1, wherein the said member is a unitary tube and the temperature-sensitive element comprises a coiled wire whose ohmic resistance varies with temperature, said wire being disposed within the tube.

5. The invention as recited in claim 1, wherein said member comprises a pantograph mechanism formed of a plurality of rigid arms pivotally secured together and the temperature-sensing element comprises a series of resistance units whose ohmic resistance varies with temperature, said units being secured to the said arms.

6. Apparatus for measuring the average temperature of a liquid subject to changes in actual level in a tank, said apparatus comprising an elongated rigid member, means pivotally securing one end of said member at the bottom of the liquid-containing tank, float means supporting the other end of said member adjacent the level of said liquid, a temperature-sensitive element substantially uniformly distributed throughout the length of said member and indicating means calibrated in temperature values and responsive to the temperature-sensitive element, said indicating means being disposed externally of the tank.

7. The invention as recited in claim 6 wherein the said member comprises a unitary tube, the said temperature-sensitive element is a wire whose ohmic resistance varies with temperature and disposed within the tube, and including a source of voltage, and circuit elements connecting the said wire and indicating means to the source of voltage.

8. The invention as recited in claim 6, wherein the said member is a pantograph mechanism formed of a plurality of rigid arms pivotally secured together, the said temperature-sensitive element comprises a plurality of coils carried by the said arms and whose ohmic resistance varies with temperature, and including a source of voltage, and circuit elements connecting the said coils and indicating means to the source of voltage.

9. A float-actuated arrangement for use in the determination of the average temperature of a liquid subject to changes in actual level in a tank, said arrangement comprising an elongated rigid member, means pivotally securing one end of said member at the bottom of a liquid-containing tank, said member having float means adapted to support the other end of said member adjacent the level of the said liquid, and a temperature-sensitive element substantially uniformly distributed throughout the length of said member, said member being tubular and said temperature-sensitive element comprising a fluid enclosed by said member and having a relatively high temperature coefficient of expansion.

10. Apparatus for measuring the average temperature of a liquid subject to changes in actual level in a tank, said apparatus comprising an elongated tubular member, means pivotally securing one end of the said member at the bottom of the tank, float means adapted to support the other end of said member adjacent the level of said liquid, a fluid within the tubular member said fluid being of the type whose volume changes with temperature, a pressure-responsive instrument disposed externally of the tank and having a scale calibrated in temperature values, and a connecting tube extending between the said instrument and the said one end of the tubular member.

References Cited in the file of this patent

UNITED STATES PATENTS

| | | |
|---|---|---|
| 712,699 | May | Nov. 4, 1902 |
| 1,777,415 | Morgan | Oct. 7, 1930 |
| 1,828,753 | Spikes | Oct. 17, 1931 |
| 2,282,277 | Whittier | May 5, 1942 |
| 2,677,276 | Schmidt | May 4, 1954 |

FOREIGN PATENTS

| | | |
|---|---|---|
| 820,409 | France | Nov. 10, 1937 |